United States Patent [19]
Dransch et al.

[11] 3,896,142

[45] July 22, 1975

[54] PROCESS FOR THE PREPARATION OF SUBSTITUTED BENZIMIDAZOLES

[75] Inventors: Gunther Dransch, Eschborn, Taunus; Gerhard Horlein, Frankfurt am Main, both of Germany

[73] Assignee: Hoechst Aktiengesellschaft, Frankfurt am Main, Germany

[22] Filed: Oct. 11, 1973

[21] Appl. No.: 405,400

[30] Foreign Application Priority Data
Oct. 14, 1972  Germany............................ 2250469

[52] U.S. Cl............................ 260/309.2; 260/309.2
[51] Int. Cl............................................ C07d 49/38
[58] Field of Search................................. 260/309.2

[56] References Cited
UNITED STATES PATENTS
3,480,642  11/1969  Stedman.......................... 260/309.2

Primary Examiner—Henry R. Jiles
Assistant Examiner—C. M. S. Jaisle
Attorney, Agent, or Firm—Curtis, Morris & Safford

[57] ABSTRACT

A process for the preparation of 2-benzimidazole-carbamic acid alkyl and benzyl esters or the salts thereof, which comprises converting 2-amino-benzimidazoles with bases to their alkali metal or alkaline earth metal salts reacting these compounds with carbonic acid dialkyl or dibenzyl esters with exclusion of water, and optionally converting the 2-benzimidazole carbamate salts obtained to the free 2-benzimidazole-carbamic acid esters by acidification.

6 Claims, No Drawings

PROCESS FOR THE PREPARATION OF SUBSTITUTED BENZIMIDAZOLES

The present invention provides a process for the preparation of 2-benzimidazole-carbamic acid alkyl and benzyl esters or the salts thereof, which comprises converting 2-amino-benzimidazoles with bases to their alkali or alkaline line earth metal salts reacting these compounds with carbonic acid dialkyl or dibenzyl esters with exclusion of water, and optionally converting the 2-benzimidazole carbamate salts obtained to the free 2-benzimidazole-carbamic acid esters by acidification.

U.S. Pat. No. 3,480,642 discloses a process for the manufacture of 2-alkoxycarbonylamino-benzimidazoles by first preparing 1-alkoxy-carbonyl-2-amino-benzimidazoles by reacting 2-aminobenzimidazoles with chloroformic acid esters and converting the reaction product to 2-alkoxycarbonylamino-benzimidazoles by heating it in anhydrous pyridine, dimethyl formamide or acetonitrile. However, this conversion gives poor yields and produces substantial amounts of by-products insoluble in alkali and acids, so that this reaction has no economic importance. Surprisingly, when using carbonic acid esters instead of chloroformic acid esters, the substitution takes place directly at the amino groups in 2-position of the benzimidazole ring instead of in 1-position. The reaction gives excellent yields and the product is free from undesirable 1-isomer as well as from other side products.

The reaction proceeds according to the following scheme; Na-methylate being used as base:

ketone, diethyleneglycol-dimethyl ether, or in the carbonic acid ester used as reactant. The 2-aminobenzimidazole or a corresponding substituted derivative may be first converted to the salt thereof, and this salt may then be used for the reaction. Suitable for the conversion to salt are above all alkali metal or alkaline earth metal alcoholates and hydroxides, other basic substances such as $NaNH_2$ and $NaH$ or organo-metallic compounds such as triphenyl sodium. The salt may also be formed in situ and then treated directly in solution or suspension, but in this case the use of anhydrous bases is required.

Generally, the operation mode is the following: the base and the carbonic acid ester are added to the solution or suspension of the 2-aminobenzimidazole in an organic solvent, the sequence of addition of the reactants and the amount of solvent not being critical. For economic reasons it is advantageous to maintain a low reaction volume. It is not necessary to use the reactants of the 2-aminobenzimidazole in an equivalent ratio. The carbonic acid ester may rather be used in excess or as solvent, or the base may be employed in excess.

The reaction time is from a few minutes to several hours, the reaction temperature from 10° to 250° C, preferably from 25° to 100° C. The reaction yields a benzimidazole-carbamate salt which generally is insoluble in the reaction medium. This salt may be isolated by filtration or the free 2-benzimidazole-carbamic acid esters may be obtained by acidification. For this purpose the product obtained is advantageously adjusted to a pH of from 3 to 5 by means of an organic or inorganic acid, for example acetic acid, formic acid, hydrochloric or sulfuric acid. A preliminary dilution of the reaction product with water is advantageous. On the

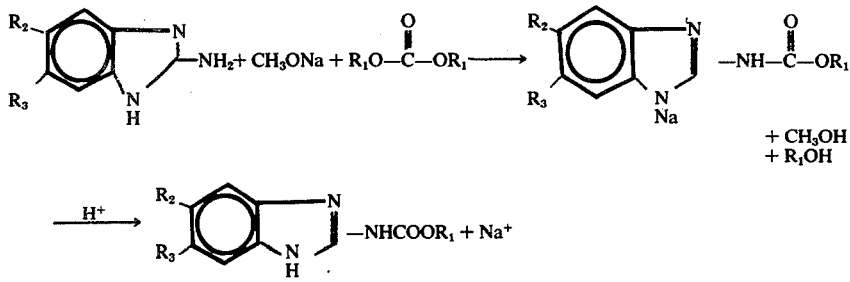

The 2-aminobenzimidazoles used or the salts thereof may contain any substituents, provided that they are inert under the reaction conditions. The following examples may be cited: $R_1$: alkyl having from 1 to 6 carbon atoms, benzyl; $R_2$, $R_3$: hydrogen, chlorine, bromine, fluorine, nitro, alkyl alkoxy or alkylthio having from 1 to 5 carbon atoms, phenylthio, phenoxy or benzoyl.

Preferred radicals $R_1$ are methyl, ethyl or n-butyl; $R_2$ is preferably hydrogen, n-butyl, chlorine, bromine, methoxy, ethoxy, benzoyl, phenoxy or phenylmercapto. $R_3$ is preferably hydrogen.

The 2-aminobenzimidazoles used as starting material may be prepared according to known methods, for example according to Annales de Chimie [8], 15, 189-193.

The process is advantageously carried out in an inert organic solvent, for example in an alcohol having from 1 to 4 carbon atoms, tetrahydrofurane, dioxane, acetonitrile, dimethylformamide, acetone, methylethylother hand, it is also possible to suspend or to dissolve first the isolated salt in water and to adjust it then to the desired pH.

The insoluble reaction product is filtered off, washed and dried.

The products of the process of the invention are for their greater part known compounds which have a wide range of fungicidal and anthelmintic activity. In the form of their alkali metal and alkaline earth metal salts, they are starting substances for the synthesis of plant protection agents and pharmaceuticals.

The following examples illustrate the invention.

EXAMPLE 1

2-Methoxycarbonylamino-benzimidazole

To a suspension of 24.4 g of 2-aminobenzimidazole in 150 ml of tetrahydrofurane a mixture of 16.2 g of sodium methylate and 22.5 g of carbonic acid dimethyl ester is added and the suspension is refluxed for 2 hours. Subsequently, the suspension obtained is poured into 300 ml of water and neutralized with hydrochloric acid. The white reaction product is filtered off, washed with water and dried.

37.8 g (99% of the theoretical yield) of 2-methoxycarbonylaminobenzimidazole, having a decomposition point of 310°–315° C, are obtained.

When using carbonic acid di-n-hexyl ester instead of the corresponding dimethyl ester and hexanol as solvent, 2-hexyloxycarbonyl-amino-benzimidazole (decomposition starting from 250° C) is obtained.

EXAMPLE 2

2-Ethoxycarbonylamino-benzimidazole 61.5 of 2-aminobenzimidazole and 59 g of carbonic acid diethyl ester are added, with agitation, to a solution of 11.5 g of sodium in 500 ml of ethanol, and the whole is refluxed for 1 hour. Subsequently, the suspension obtained is adjusted to a pH of 7.5 by means of diluted acetic acid, filtered off and dried.

The 2-ethoxycarbonylamino-benzimidazole obtained decomposes at 328° C.

EXAMPLE 3

Sodium salt of 2-ethoxycarbonylamino-benzimidazole 11.8 g of diethyl carbonate are added to a solution of 13.3 g of 2-aminobenzimidazole and 5.5 g of sodium methylate in 100 ml of dioxane. The solution is stirred for 3 hours at 60° C, allowed to cool, the precipitate consisting of the sodium salt of 2-ethocycarbonylamino-benzimidazole is filtered off washed with ethanol and dried. It decomposes above 360° C.

When using carbonic acid dibenzyl ester instead of diethyl carbonate, the sodium salt of 2-benzyloxycarbonylamino-benzimidazole having a decomposition point of above 250° C is obtained.

EXAMPLE 4

Potassium salt of 2-methoxycarbonylaminobenzimidazole 18 g of carbonic acid dimethyl ester and 26.4 g of 2-amino-benzimidazole are added to a solution of 7.82 g of potassium in 200 ml of methanol, the solution is refluxed for 2 hours and the precipitated reaction product is filtered off. The dried salt decomposes above 360° C.

EXAMPLE 5

2-Methoxycarbonylamino-5(6)-chlorobenzimidazole 9 g of carbonic acid dimethyl ester are added to a solution of 16 g of 2-amino-5(6)-chlorobenzimidazole and 5.4 g of sodium methylate in 100 ml of dimethyl formamide and the solution is heated for 30 minutes at 60° C with agitation. Subsequently, 300 ml of water are added to the reaction mixture, and neutralization is carried out using diluted hydrochloric acid.

The 2-methoxycarbonylamino-5(6)-chlorobenzimidazole formed is filtered off, washed and dried. It decomposes at 295° C.

EXAMPLE 6

By reacting correspondingly substituted 2-aminobenzimidazoles with carbonic acid dimethyl ester according to the operation modes of Example 1 or 5, the following compounds are obtained:

| Starting substance | Final product | Decomp. P. |
| --- | --- | --- |
| a) 2-amino-5,6-dimethyl-benzimidazole | 2-methoxycarbonylamino-5,6-dimethyl-benzimidazole | 300°C |
| b) 2-amine-5(6)-n-butyl-benzimidazole | 2-methoxycarbonylamino-5(6)-n-butylbenzimidazole | 221°C |
| c) 2-amino-5(6)-methyl-benzimidazole | 2-methoxycarbonylamino-5(6)-methylbenzimidazole | 298°C |
| d) 2-amino-5(6)-phenylthio benzimidazole | 2-methoxycarbonylamino-5(6)-phenylthio-benzimidazole | 233°C |
| e) 2-amino-5(6)-benzoyl-benzimidazole | 2-methoxycarbonylamino-5(6)-benzoyl-benzimidazole | 285°C |
| f) 2-amino-5(6)-phenoxy-benzimidazole | 2-methoxycarbonylamino-5(6-phenoxy-benzimidazole | 248°C |
| g) 2-amino-5(6)-methoxy-benzimidazole | 2-methoxycarbonylamino-5(6)-methoxy-benzimidazole | |
| h) 2-amino-5(6)-ethoxy-benzimidazole | 2-methoxycarbonylamino-5(6)-ethoxy-benzimidazole | 226°C |

What is claimed is:

1. A process for the preparation of a 2-benzimidazole-carbamic acid alkyl or benzyl ester or a salt thereof, which comprises reacting a 2-aminobenzimidazole with a base and a carbonic acid dialkyl or dibenzyl ester with exclusion of water to obtain the corresponding 2-benzimidazole alkyl or benzyl carbamate salt.

2. The process defined in claim 1, in which the 2-benzimidazole alkyl or benzyl carbamate salt is acidified to the corresponding free 2-benzimidazole carbamic acid ester.

3. The process defined in claim 1, in which the 2-aminobenzimidazole is first converted with a base to the corresponding alkali metal or alkaline earth metal salt and the said salt is then reacted with a carbonic acid dialkyl or dibenzyl ester.

4. The process defined in claim 1, in which the 2-aminobenzimidazole has the formula

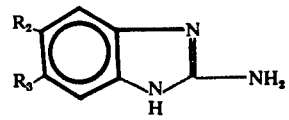

in which $R_2$ and $R_3$ are the same or different and represent hydrogen, fluorine, chlorine, bromine, nitro, alkyl of 1 to 5 carbon atoms, alkoxy of 1 to 5 carbon atoms, alkythio of 1 to 5 carbon atoms, phenylthio; phenoxy or benzoyl and the carbonic acid dialkyl or dibenzyl ester has the formula

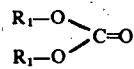
in which $R_1$ is alkyl of 1 to 6 carbon atoms or benzyl.
5. The process as defined in claim 1, wherein said carbonic acid dialkyl ester is carbonic acid dimethyl ester.
6. The process as defined in claim 1, wherein said base is sodium methylate.
* * * * *